United States Patent [19]
Jung et al.

[11] Patent Number: 4,502,905
[45] Date of Patent: Mar. 5, 1985

[54] TYING MACHINE AND METHOD

[75] Inventors: Charles H. Jung; Charles G. Jung, both of Seattle, Wash.

[73] Assignee: The Boeing Company, Seattle, Wash.

[21] Appl. No.: 431,059

[22] Filed: Sep. 30, 1982

[51] Int. Cl.[3] ........................ B65H 81/00; B31F 1/00; B29C 19/04; B21F 45/00

[52] U.S. Cl. .................................... 156/184; 156/187; 156/199; 156/274.4; 156/443; 156/486; 100/27; 140/57; 140/93 A

[58] Field of Search ............... 156/443, 468, 475, 486, 156/184, 187, 274.4, 275.1, 199; 100/27; 140/57, 93 A

[56] References Cited

U.S. PATENT DOCUMENTS

| | | | |
|---|---|---|---|
| 54,810 | 5/1866 | Adams | 140/93.2 |
| 587,926 | 8/1897 | Bates et al. | 14/36 |
| 774,226 | 11/1904 | Wiseburn et al. | 100/32 |
| 1,784,025 | 12/1930 | Norton | 140/93 R |
| 3,033,102 | 5/1962 | Friyklund | 156/274.4 |
| 3,118,365 | 1/1964 | Rollo et al. | 156/379.7 |
| 3,154,114 | 10/1964 | Bailey | 140/106 |
| 3,179,128 | 4/1965 | Price | 140/93.2 |
| 3,250,209 | 5/1966 | Gage et al. | 100/26 |
| 3,269,300 | 8/1966 | Billet et al. | 156/502 |
| 3,348,584 | 10/1967 | Beach | 140/93.2 |
| 3,368,590 | 2/1968 | Welden | 140/93 R |
| 3,466,847 | 9/1969 | Farkas | 156/484 |
| 3,489,076 | 1/1970 | Countryman | 100/26 |
| 3,527,157 | 9/1970 | Elineau | 100/28 |
| 3,589,406 | 6/1971 | Moberg | 140/93 A |
| 3,633,633 | 1/1972 | Countryman | 140/93.2 |
| 3,648,739 | 3/1972 | Angerola | 140/93.2 |
| 3,665,845 | 5/1972 | Lyon | 100/27 |
| 3,669,799 | 6/1972 | Vilcins et al. | 156/359 |
| 3,771,436 | 11/1973 | Sato | 156/499 |
| 3,830,263 | 8/1974 | Benfer | 140/93.2 |
| 4,094,342 | 6/1978 | Nishikawa et al. | 140/93.2 |

*Primary Examiner*—Edward Kimlin
*Assistant Examiner*—Merrell C. Cashion
*Attorney, Agent, or Firm*—Hughes, Barnard & Cassidy

[57] ABSTRACT

A typing ribbon is carried by a carrier ring around a bundle of wires, while locating pins hold the ribbon spaced from the wires. A finger engages the ribbon and moves it laterally across one of the ribbon loops to form the tie. Then, an electrically heated weld bar engages the ribbon at the tie area to bond the ribbon portion to one another.

52 Claims, 28 Drawing Figures

FIG. 1A
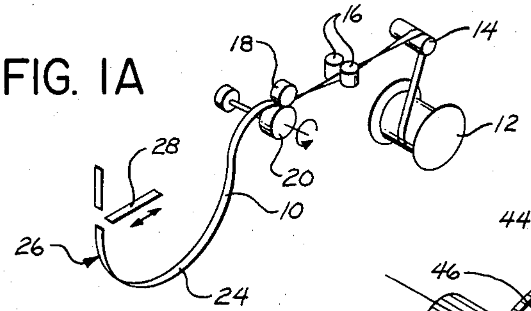
FIG. 1B
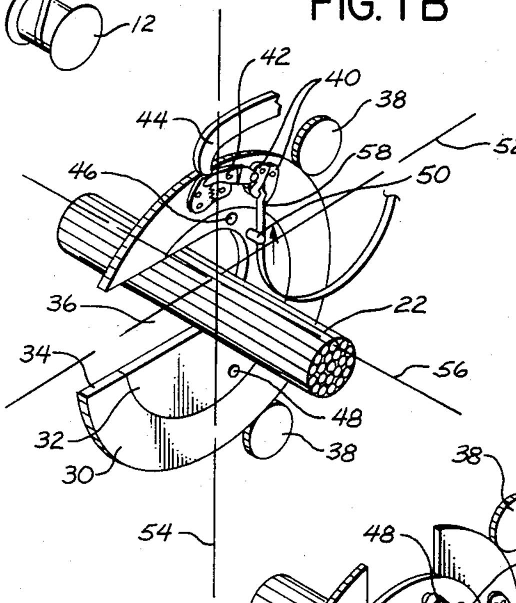
FIG. 1C
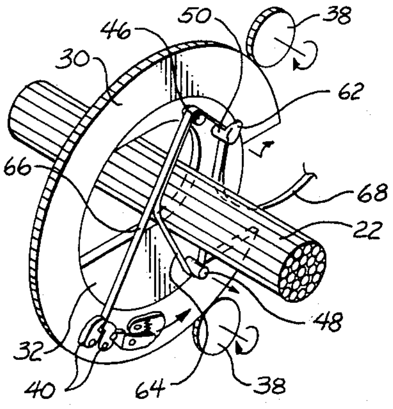
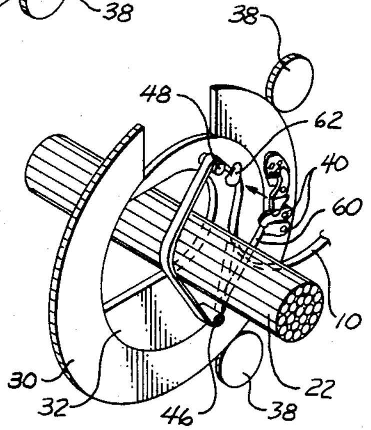
FIG. 1D
FIG. 1E
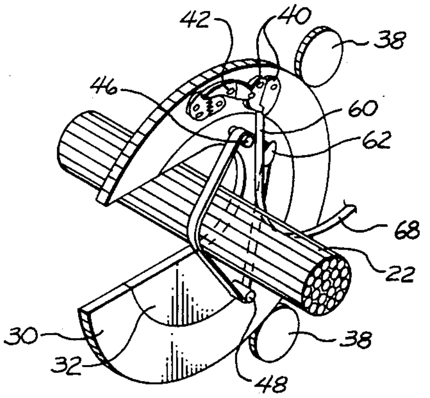

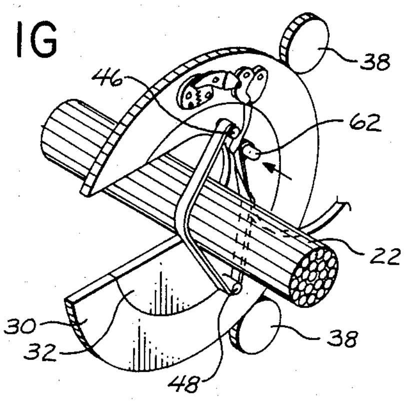
FIG. 1G
FIG. 1F
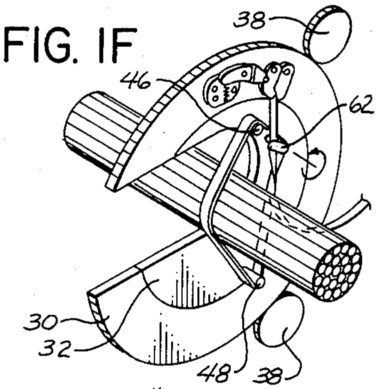
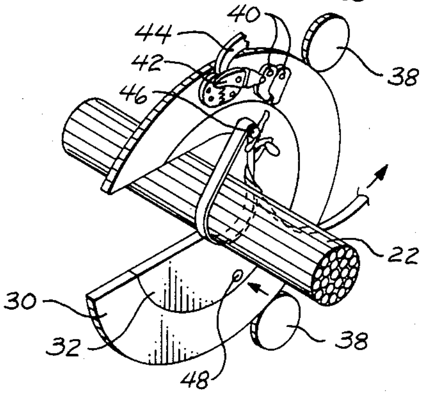
FIG. 1H
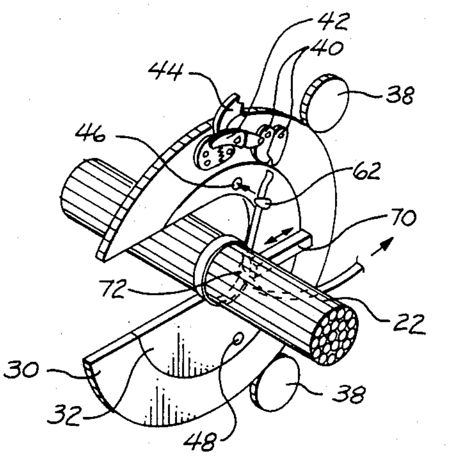
FIG. 1I
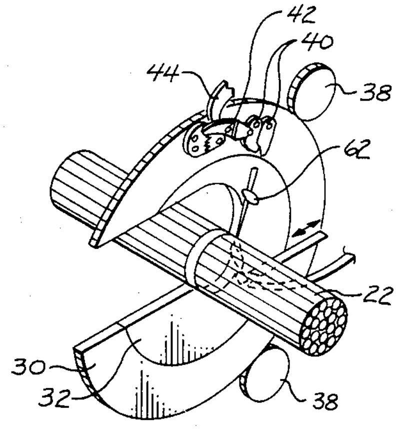
FIG. 1J
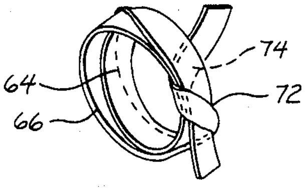
FIG. 2

FIG. 3
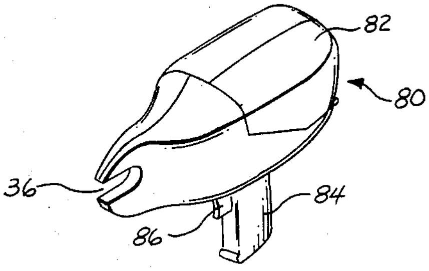
FIG. 4
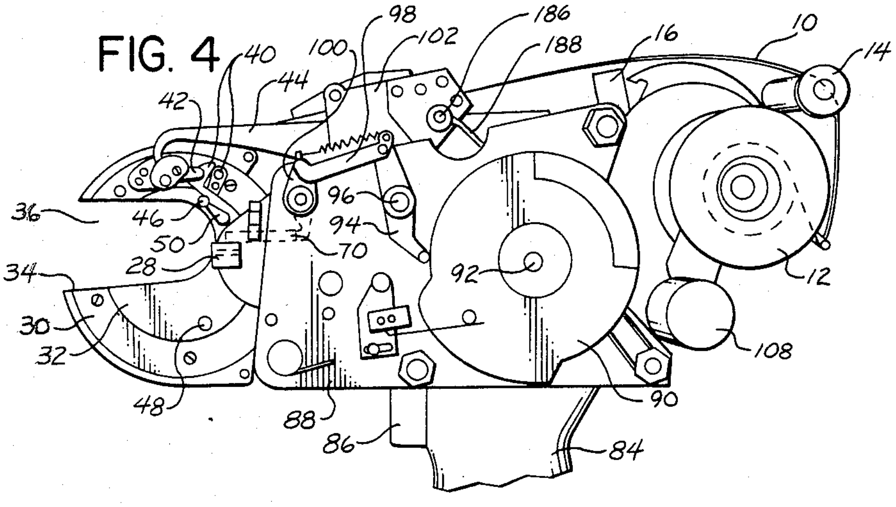
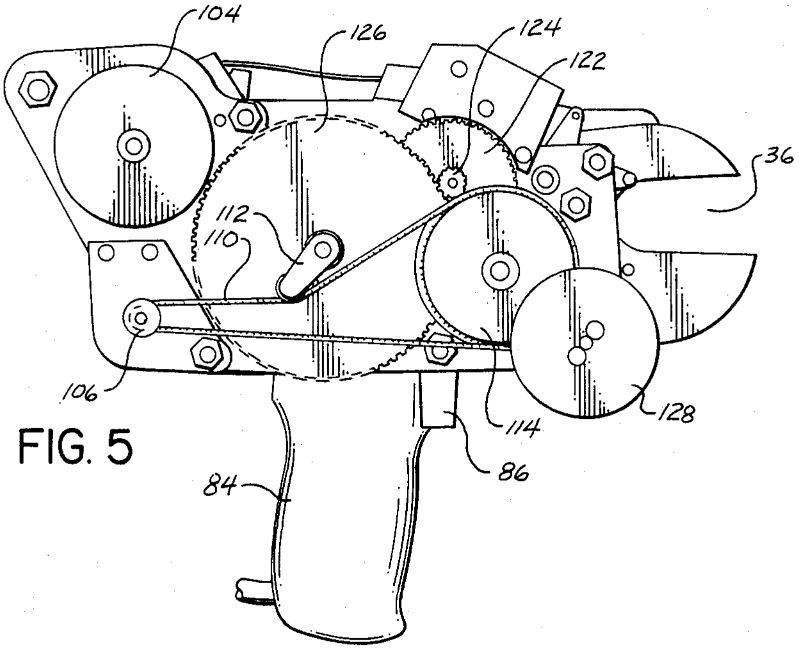
FIG. 5

FIG. 9
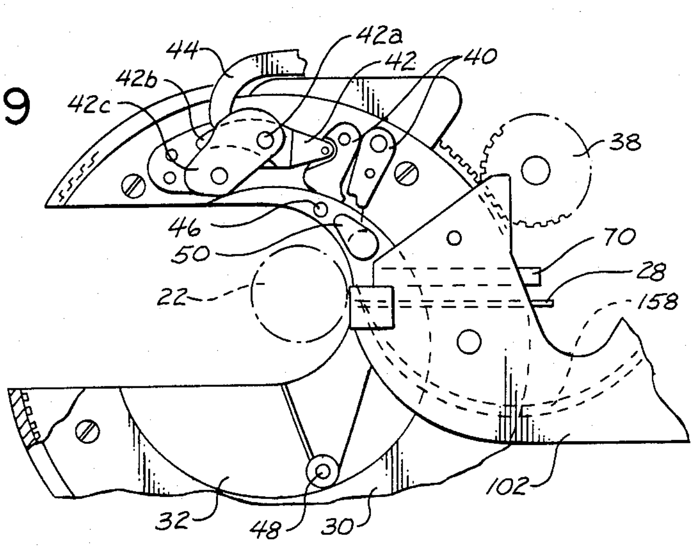
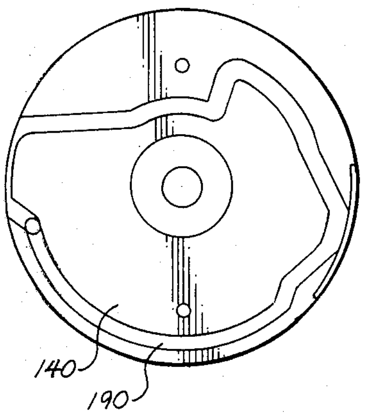
FIG. 10
FIG. 11
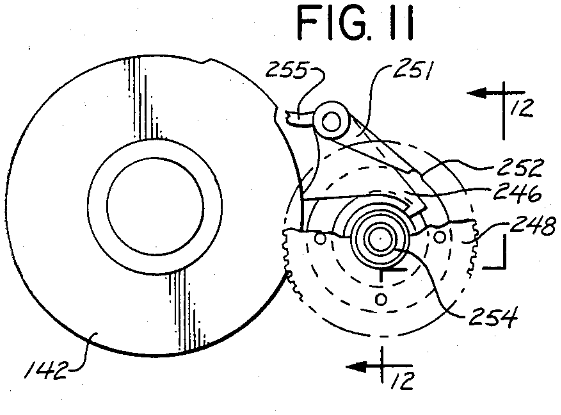
FIG. 12
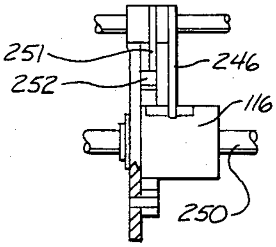

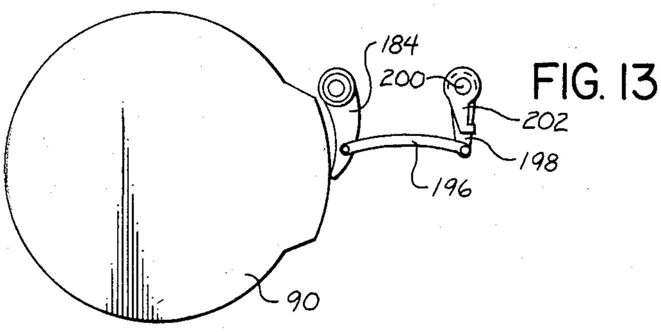
FIG. 13
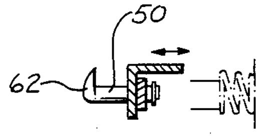
FIG. 15
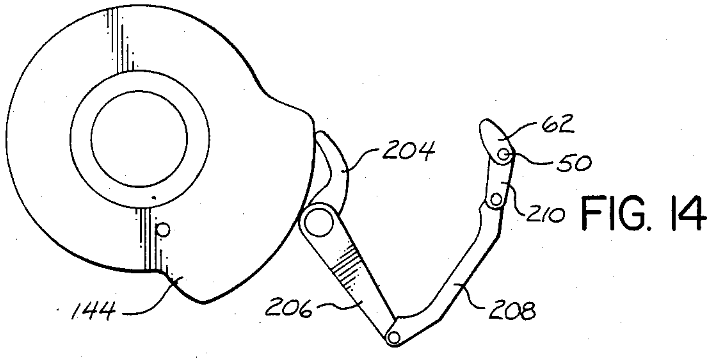
FIG. 14
FIG. 16
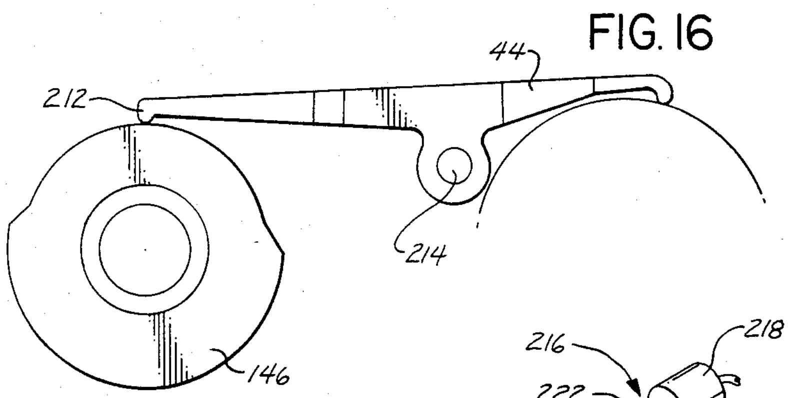
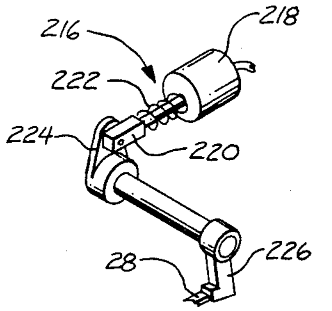
FIG. 17

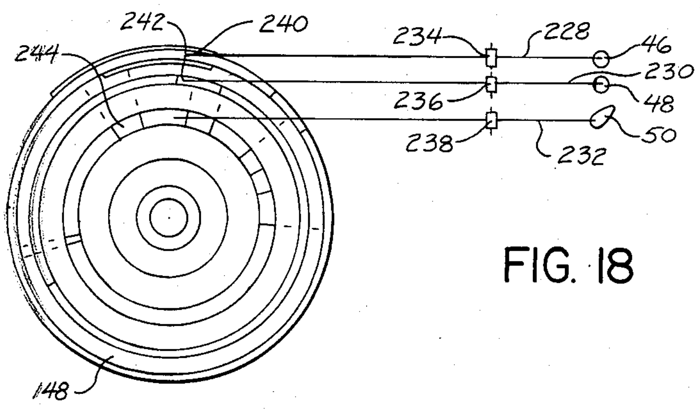
FIG. 18
FIG. 19
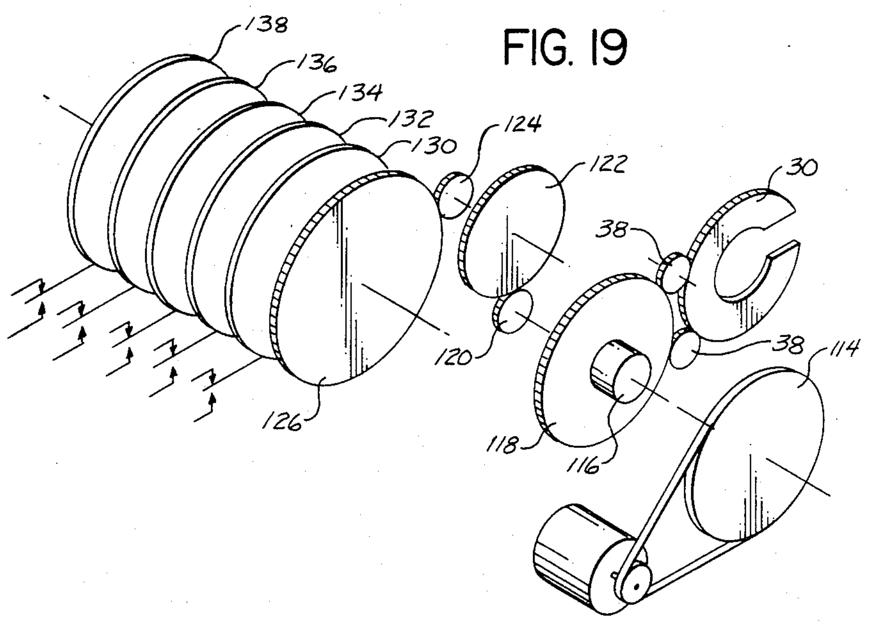

TYING MACHINE AND METHOD

The present invention relates to a method and apparatus for making a tie around an object, and more particularly to such an apparatus and method as adapted for tying bundles of electrical wires that are used in aircraft.

BACKGROUND ART

One of the manufacturing problems in modern day aircraft is the placement of the bundles of electrical wire which are distributed throughout the aircraft. Quite commonly, a number of relatively long lengths of wire are grouped together in a bundle and tied at regularly spaced intervals along their length. This enables the bundles to be pulled through the aircraft structure to the appropriate locations. This tying is commonly accomplished simply by a manual operation, where a person ties a short length of string around the bundle. The flexible string makes a reliable tie, and as the bundle is pulled through the aircraft, the string tie is not prone to catch on the aircraft structure. However, this manual operation of making numerous ties for the many bundles of wire is time consuming and thus rather expensive.

Accordingly, there have been various attempts to make automated bundle ties. One approach has been to use plastic straps with mechanical locking devices. However, the plastic straps have a knob which is objectionable when these wire bundles are installed because the knobs catch or hang up as they are passed through the holes during installation. Another objection is that the knobs tend to abraid adjacent wire bundles.

Another prior art approach has been to develop a lace tape tie applicator using ultrasonic energy to bond the tie. However, to the best knowledge of the applicants, the ties produced by the ultrasonic tie gun are somewhat lacking in that they are sometimes not sufficiently tight and sometimes have poor bond strength. There have been in the prior art various devices which use moderately stiff wires which are wrapped around the bundle and then twisted to form a tie. However, these also have a drawback in that such ties tend to catch or hang up on the structure as the bundle is pulled through holes, and these also can abrade adjacent wires.

A search of the U.S. patent literature has disclosed a number of patents relating to various tying devices, and these are discussed briefly below.

U.S. Pat. No. 54,810, Adams, shows a bale tying device having a rotatable member which engages two members to cause these to move oppositely to one another and tighten a hoop that is placed around the bale.

U.S. Pat. No, 587,926, Bates et al, shows another bale tying device which stretches a wire and cuts it. It then forms a loop in the rear end of the wire so that the wire can be tied.

U.S. Pat. No. 774,226, Wiseburn et al, shows a mechanical device which grasps two ends of a binding tape and pulls these tight.

U.S. Pat. No. 1,784,025, Norton, shows a device for stretching a strap which has previously been placed around a package.

U.S. Pat. No. 3,033,102, Friyklund, shows a cable lacing machine where the lace is fed by a needle to a gripper and then pulled around the bundle. The gripper and needle are then rotated to make a tie, and an electrode is moved down to squeeze the knot and also make a weld.

U.S. Pat. No. 3,118,365, Rollo et al, shows an apparatus where a strip is placed along the length of the wires which are to be bound. A tie is made around the wire bundle and over the strip. The strip has a conductor placed therein to enhance the electrical conductivity at the location of the tie and thus aid in creating heat to cause a bond.

U.S. Pat. No. 3,154,114, Bailey, shows a hand tool to grip, tension, and then cut a strap which has already been placed around a bundle of wires.

U.S. Pat. No. 3,179,128, Price, shows a hand tool to fasten a strap. One end of the strap is placed on the tool and the other end is wrapped around the wire bundle. Operation of the tool pulls the strap and pushes it down to a fastening position.

U.S. Pat. No. 3,250,209, Gage et al, shows a device for wrapping a strand around a bundle of wires. The strand is fed through a curved element having an interior groove to accommodate the strand, until the strand engages a stop. An arm then moves down to clamp the strand, after which the strand is tightened. Then the ends of the strand are stapled together and the strand is cut to complete the tie.

U.S. Pat. No. 3,269,300, Billett et al, shows a strapping machine where a plastic strap is force fed through a yoke which surrounds the article which is to be strapped. The apparatus then tensions the strap to pull it out of the yoke, and a heating element is moved adjacent to overlapping parts of the strap. A cam actuated member pushes the overlapping straps against the heating element, and the heated strap portions are held together until cooled to complete the bond. The strap is then cut.

U.S. Pat. No. 3,348,584, Beach, shows a hand tool to grip two end portions of a strap that has previously been placed around an object and inserted in a buckle. The tool is pivoted to tighten the strap.

U.S. Pat. No. 3,368,590, Welden, shows a wire tying machine where a piece of wire is directed through a track to form a 270° arc around a group of rods which are to be tied. Then the loop ends are engaged by a twister to form a tie.

U.S. Pat. No. 3,466,847, Farkas, shows a device where a bundle is moved through a set of open jaws and a tape is placed between the jaws. The jaws are closed to form a bond on the tape.

U.S. Pat. No. 3,489,076, Countryman, shows a device where a strap is pushed through a loop member around a bundle of wires. The overlapping ends of the loop are bonded one against the other.

U.S. Pat. No. 3,527,157, Elineau, shows a device where a ring rotates around a bundle to wrap wire around the bundle. The wire is unwound and carried by a pulley mounted on the wheel. There is a cutter and twister to tie the ends of the wire in a twisted pattern.

U.S. Pat. No. 3,589,406, Moverg, discloses a hand tool for tightening a shackle that is placed around the neck of a bag.

U.S. Pat. No. 3,633,633, Countryman, shows a device where a pair of jaws are opened to receive a wire bundle. The jaws are then closed, and a ribbon is fed in a guide in the jaws around a bundle. Then the ribbon is twisted to join the ends of the ribbon together.

U.S. Pat. No. 3,648,739, Angerola, shows a strap clamping and severing assembly where the strap is manually placed around the article, and the device tightens, bonds, and severs the strap.

U.S. Pat. No. 3,665,845, Lyon, illustrates a rotatable ring that is positioned around the object to be tied. The ring has four retractable fingers which carry a tape around the package. The fingers are retracted, the tape tightened, and a heating element bonds overlapping portions of the tape. A knife then cuts the tape.

U.S. Pat. No. 3,669,799, Vilcins et al, shows an apparatus where a strap is manually placed around a package, after which the device tightens and bonds the strap.

U.S. Pat. No. 3,771,436, Sato, discloses a specific mechanism for bonding a strap which has been placed around an article.

U.S. Pat. No. 3,830,263, Benfer, discloses a tool for applying a strap, where the strap is placed around a wire bundle, and then the end of the strap is inserted in the hand tool to be tightened. This same general type of hand tool is also shown in U.S. Pat. No. 3,865,156, Moody et al.

U.S. Pat. No. 4,094,342, Nishikawa et al, shows an automatic binding device where a bundle is placed in a ring-shaped guide member. The tying string or wire is fed through the guide member to form a tie around the bundle.

In view of the foregoing, it is an object of the present invention to provide a method and apparatus for effectively and reliably forming a tie around a bundle of wires, and particularly for applying a tie around a bundle of wires which are to be mounted in an aircraft.

It is a further object to provide an apparatus which can be incorporated in a portable hand carried tool and which can be operated at relatively high speeds to form the tie, and also to form a bond.

It is also an object to provide the apparatus and method where a heated bonded member can adequately perform its bonding operation, in a manner to be self-cleaning.

SUMMARY OF THE INVENTION

The apparatus of the present invention is particularly adapted to tie a ribbon around an object, such as a bundle of wires. The apparatus comprises a housing having:

(1) a wrapping area where there is a longitudinal axis, a vertical axis, and a transverse axis perpendicular and intersecting the longitudinal and vertical axes;

(2) a reference plane coinciding with said longitudinal and vertical axes; and (3) a tying area spaced from said transverse axis.

The wrapping area has first and second sides on opposite sides of the reference plane, an outside direction denoting a location further from said transverse axis and an inside direction denoting a location closer to the transverse axis.

There is a carrier mounted to the housing and adapted to engage a lead portion of the ribbon and move in a wrapping path circumscribing the wrapping area to form a single ribbon loop or two or more ribbon loops. There is transversely movable locating and tie means to locate the ribbon around the wrapping area and to move the ribbon transversely.

Control means is provided to move the carrier in a circumferentially forward direction along the wrapping path to the tying area so that a wrapping portion of the ribbon extends around the wrapping area in one loop or two or more loops and a trailing portion of the ribbon is positioned at the tying area at the second side of the lead portion. The control means then operates the locating and tie means to move the lead portion and trailing portion transversely relative to one another in one direction to move the lead portion to the second side of the trailing portion, with one of the portions being outside the other of the portions. Then, the control means moves the lead portion and trailing portion transversely relative to one another in an opposite direction to move the lead portion to the first side of the trailing portion, with the other of said portions being inside the one of said portions. This forms a tie at the tie area.

More specifically, the control means is arranged to move the carrier to move the lead portion to a first location on the path where the lead portion is on the first side of the trailing portion. Then, the control means moves the locating and tie means to move the trailing portion transversely from the second side of the lead portion to the first side of the lead portion at a location circumferentially forward of the lead portion. Then, the control means continues movement of the carrier circumferentially forward to carry the lead portion across and to the second side of the trailing portion to a more circumferentially forward location. Then the locating and tie means engages the lead portion and moves the lead portion transversely inside of the trailing portion to the first side of the trailing portion.

Further, the apparatus comprises a bonding member adapted to engage the ribbon at the tie area to bond the lead and trailing portions of the ribbon at the tie area. Desirably, the bonding member comprises a heatable bonding tip positioned to engage the ribbon. There is heating means to raise the temperature of the bonding member to a suitable bonding temperature. The control means includes means to heat the bonding member and move the bonding member into engagement with the ribbon at the tie area subsequent to the formation of the tie.

There is a cutter member positioned to engage and cut the trailing portion of the ribbon. The control means includes means to operate the cutting member to cut the ribbon subsequent to the formation of the bond at the tie.

More specifically, the carrier ring is mounted to a mounting plate located proximate the wrapping and tying area. The locating and tie means comprises at least two locating pins. Preferably, there is an upper retractable locating and a lower retractable locating pin positioned on opposite sides of a middle cutout of said plate, which cutout is centrally located in said wrapping area. Further, there is a tie finger mounted to the plate and having a first position at the reference plane and a second retracted position spaced to the one side of the reference plane.

Also, there is an issuer member adapted to carry the ribbon and dispense the ribbon to form a tie.

In the preferred form, the tie finger comprises a transversely extending finger member having a laterally extending hook member at an outer end thereof. The control means is adapted to extend the finger means and then rotate the hook member in a position to engage the lead portion of the ribbon and retract to pull the lead portion inside of the trailing portion. The hook member is desirably arranged to have a clamping position relative to the mounting plate, whereby it holds the lead portion in a clamping position during the bonding operation.

In the preferred form, the control means is arranged so that during formation of the tie, the issuer member is moved toward its first gripping position, and after formation of the tie, the issuer member is moved away from the first position to tighten the ribbon to form a secure tie. Desirably, the control means maintains the issuer device in a ribbon pulling position at the time when the control means moves the bonding member into an engagement with the ribbon at the tie.

In the specific embodiment of the apparatus, there is a reel member on which the ribbon is wound. The control means is arranged to rotate the reel member in a direction to discharge the ribbon at the time the carrier ring is moving the ribbon around the wrapping area, and to retract the ribbon after the lead portion of the ribbon has been moved inside of and to the one side of the trailing portion.

In the method of the present invention, a lead portion of a ribbon is moved in a path circumscribing the wrapping area. The movement is continued to form at least one loop around the wrapping area and desirably at least two loops. The lead portion is moved to one side of the trailing portion. Then the lead portion and trailing portions are moved transversely from one another in one direction to move the lead portion to the second side of the trailing portion, one of the portions being outside the other of the portions. Then the lead portion and trailing portion are moved transversely relative to one another in an opposite direction to move the lead portion to the first side of the trailing portion, with the other of said portions being inside said one of the portions to form a tie at the area.

Subsequent to forming the tie, a bonding member is moved into engagement with the ribbon portions at the tie area to form the bond. Then the trailing edge of the ribbon is cut.

There are further specific steps in the process of the present invention in moving the operating components through the tying sequence. Since the sequence of the processing steps are disclosed above with reference to the apparatus, these will not be repeated in this summary.

Other features of the present invention will become apparent in the following detailed description.

BRIEF DESCRIPTION OF THE DRAWINGS

FIG. 1 is a semischematic isometric view illustrating the main operating components of the present invention;

FIGS. 1B through 1J are isometric views showing the operating components which actually engage the ribbon which is to be formed in a tie, these views showing the sequence of forming the tie, bonding, and then cutting the ribbon;

FIG. 2 is an isometric view showing a tie formed by the present invention;

FIG. 3 is an isometric view of a hand operated tool (i.e. a gun), incorporating the apparatus of the present invention;

FIG. 4 is a side elevational view of the left side of the gun in FIG. 3, with the cover removed;

FIG. 5 is a side elevational view of the right side of the gun in FIG. 3, with the cover removed;

FIG. 9 is a side elevational view of the carrier ring and the associated components, drawn to an enlarged scale;

FIG. 10 is a side elevational view looking at the face of a cam to operate the issuer device of the present invention;

FIG. 11 is a side view looking at the clutch cam and its associated clutch assembly which causes rotation of the carrier ring;

FIG. 12 is a view of the components of FIG. 11, taken from a view indicated at 12—12;

FIG. 13 is a side view looking at the bonding member cam and its associated cam follower;

FIG. 14 is a side view of the hook rotating cam and its associated cam follower;

FIG. 15 is a view of the actual hook member, taken at line 15 of FIG. 14;

FIG. 16 is a side view of the gripping jaw release cam and its associated arm;

FIG. 17 is an isometric view of the solenoid and associated actuating elements to move the cutter to cut the ribbon;

FIG. 18 is a semischematic view of the cam to operate the two locating pins and extend and retract the tie finger; and FIG. 19 is a semischematic, isometric, exploded view of the gear drive assembly of the present invention.

DESCRIPTION OF THE PREFERRED EMBODIMENT

Figure 6:
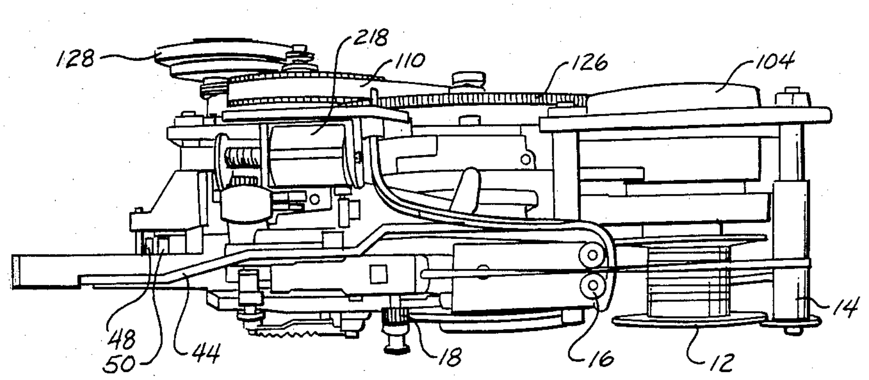
FIG. 6 is a top plan view of the apparatus shown in FIGS. 5 and 6.

It is believed that a clearer understanding of the present invention will be obtained by first describing the operation of the components of the present invention which act directly on the ribbon which forms the tie.

(a) Description of the Components That Make the Tie

In FIG. 1A, there is shown a tying ribbon 10 which is wound on a reel 12. The ribbon 10 is made of a quite flexible material which on both sides has a thin coating of a thermoadhesive material. This enables a bond to be made at an overlapping area of the ribbon 10 by applying heat to the overlapping ribbon portions for a short period of time to cause the surface material to soften and then become bonded after cooling. In the apparatus of the present invention, the ribbon 10 extends from the reel 12, over a rear horizontally aligned guide roll 14, through two vertically aligned guide rolls 16, and then through two horizontally aligned upper and lower feed rolls 18 and 20, respectively. The function of these feed rolls 18 and 20 is to initially guide the ribbon 10 into an issuer device (not shown in FIG. 1A, but described later herein) which carries the ribbon 10 in a downwardly and forwardly directed loop 24 and then in a path upwardly at 26 to a cutting and tying location which will be described more fully hereinafter. Also, as will be described later herein, the feed rolls 18 and 20 serve a limited function of advancing the ribbon 10 slightly at the initial portion of the wrapping cycle so that it can be properly gripped in jaws to be carried on its wrapping path. From the location at 26, the ribbon 10 is carried twice around a wire bundle 22 which is to be tied (this bundle 22 being shown in FIGS. 1B and following) after which the ribbon 10 is formed in a tie and then tightened to form a secure tie. The ribbon portions of the area of the tie are then bonded to one another to secure the tie. There is a cutting blade 28 which functions to sever the ribbon after the tie has been completed. Although not shown in FIG. 1A, it is to be understood that the reel 12, roll 14, roll 16, rolls 18 and 20, and blade 28 are mounted in a suitable housing structure.

With reference to FIG. 1B, there is shown a carrier ring 30 mounted by its interior circumferential edge to a circular mounting plate 32. One arcuate portion of the ring 30 is cut out to form a receiving slot 34, and the plate 32 has a corresponding cutout 36 of the same width as the slot 34. With the ring positioned as shown in 1B, the slot 34 and cutout 36 are arranged to receive the wire bundle 22. The exterior of the ring 30 is formed with teeth which engage a pair of circumferentially spaced drive gears 38. The two gears 38 are spaced from each other a sufficient distance so that one or the other of the gears 38 is always in driving engagement with the ring 30. The cutout 36 extends into the center of the plate 32 so that the bundle 22 can occupy a center position relative to the ring 30.

Mounted on one side of the ring 30 near the circumference thereof is a pair of gripping jaws 40 adapted to grip an end portion of the ribbon 10 and carry the ribbon 10 in a circumferential wrapping path around the bundle 22. The gripping jaws 40 are provided with a locking finger 42 which holds the jaws 40 in their gripping position. Also, there is a release arm 44 which engages the finger 42 to move it to a release position, thus causing the jaws 40 to open. The manner in which this is accomplished will be described in more detail later herein.

The plate 32 has upper and lower retractable locating pins 46 and 48, respectively, mounted on opposite sides of the cutout 36. Also mounted to the plate 32 is a retractable and rotatable tying finger 50, located moderately circumferentially rearwardly and radially inwardly of the upper pin 46. The function of this finger 50 in properly guiding the ribbon 10 and cooperating with the other components to form a tie is quite critical in the present invention and will be described more fully in the text which follows.

(b) Description of the Steps to Form the Tie

In describing the wrapping and tying operation with reference to FIGS. 1B through 1J, to provide a proper reference frame, the area of operation shall be considered as having a longitudinal axis 52, a vertical axis 54, and a transverse axis 56, with the transverse axis 56 being perpendicular to and intersecting the longitudinal and vertical axes 52 and 54. The longitudinal axis 52 shall be considered as being parallel to the alignment of the two slots 34 and 36, as shown in FIG. 1B; the vertical axis 54 shall be considered as perpendicular to the longitudinal axis 52 and lying in the plane parallel to the plane occupied by the carrier ring 30 and plate 32; and the transverse axis 56 shall be considered as perpendicular to the plane occupied by the ring 30 and plate 32.

The terms "right" and "left" shall be considered with reference to a view taken from the rear of the carrier ring 30 as seen in FIG. 1B. Thus, as seen in FIG. 1B, the term "right" denotes the direction on the far side of the ring 30, while the term "left" refers to the nearside location. The area within the receiving slot 36 of the plate 32, along with the immediately adjacent area, shall be considered as the "wrapping area", and the area at which an actual tie of the ribbon takes place (this being described hereinafter) will be designated the "tying area". The longitudinal and vertical axes 52 and 54 shall be considered as being just to the left of the ring 30 and plate 32, so as to coincide with the path of travel of the jaws 40 as they travel a circular path around the wrapping area. Further, the plane defined by the longitudinal and vertical axes 52 and 54 shall be considered a reference plane with respect to transverse movement relative thereto.

With reference to FIG. 1B, at the beginning of a tying cycle, the ring 30 and plate 32 are positioned as in FIG. 1B, and are moved over the wire bundle 22 so that the bundle 22 is generally centrally located in the wrapping area (i.e. located at the center of the circle defined by the ring 30). The wrapping and tying cycle is initiated by an issuer member (not shown in FIGS. 1B through 1J) carrying the forward end 58 of the ribbon 10 upwardly and into the open jaws 40. The jaws 40 are in FIG. 1B held in the open position by the release arm 44 engaging the locking finger 42. Then, the release arm 44 is rotated upwardly out of engagement with the locking finger 42, so that the locking finger 42 permits the jaws 40 to grip the ribbon end 58. The manner in which this is done can be seen more clearly in FIG. 9, which shows the finger 42, pivotally mounted at *42a*, with the forward end *42b* urged upwardly by a compression spring *42c*. When the arm 44 is depressed, it rotates the finger 42 against the action of the spring *42c* to cause the forward jaw 40 to rotate out of its locking position With the arm 44 disengaged, the spring *42c* moves the forward finger end *42b* upwardly to push the forward jaw 40 against the rear jaw 40 to a locking position.

The carrier ring 30 is then rotated clockwise (as seen in FIG. 1B) a short arcuate distance so that a leading portion 60 of the ribbon 10 is positioned just rearwardly of the tying finger 50. (In describing the direction of rotation of the ring 30, the movement will be with reference to the movement of the gripper jaws 40. Counterclockwise movement of the gripper jaws 30 will be considered as a "circumferentially forward" path of travel, while the clockwise movement thereof, as seen in FIG. 1B, will be considered as "circumferentially rearward" path of travel.)

With the components positioned as shown in FIG. 1B, the two locating pins 46 and 48 and the tying finger 50 are extended outwardly to the position shown in FIG. 1C. The tying finger 50 has at its outer end a small hook 62 which extends a short distance at a right angle from the axis of the finger 50. In the position of FIG. 1C, after extension the finger 50 is rotated so that the hook 62 extends upwardly and rearwardly.

With the pins 46 and 48 and the finger 50 extended, the carrier ring 30 is rotated to carry the lead portion 60 of the ribbon 10 in a circumferential wrapping path around the wrapping area occupied by the bundle 22. As shown in FIG. 1C, the ring 30 has completed approximately $1\frac{1}{2}$ revolutions, so that the ribbon 10 has formed a first loop 64 and is beginning the formation of a second loop 66. At the same time as the loops 64 and 66 are being formed, the reel 12 is rotated to unwind the ribbon 10 outwardly to minimize any drag or tension on the ribbon 10.

As the ring 30 continues to rotate in a circumferentially forward direction from the position of FIG. 1C to FIG. 1D, the lead portion 60 of the ribbon 10 passes to the right of a trailing portion 68 of the ribbon 10. At approximately the same time, the tying finger 50 is moving to the right to pull that portion of the ribbon 10 which it engages moderately to the right of the reference plane (i.e. the plane through which the gripper jaws 40 carry the lead portion 60 of the ribbon 10 in its circular path of travel).

Thus, as the ring 30 continues to move circumferentially forward to complete the second full revolution, the lead portion 60 of the ribbon 10 crosses the trailing ribbon portion 68 on the outside thereof. (For purposes of description, the term "outside" shall denote a position further outward from the wrapping area that is proximate the transverse axis 56, while the term "inside" shall denote a direction toward the wrapping area proximate the transverse axis 56.) With the jaws 40 positioned as shown in FIG. 1E, the lead portion 60 of the ribbon 10 is positioned just to the left of the adjacent portion of the ribbon 10 and just forwardly of the tying finger 50. At this time, the ring 30 is stationary and remains so during the remainder of this cycle.

Next, as illustrated in FIG. 1F, the tying finger 50 is extended (i.e. moves to the left) so that it is positioned to the left of the lead portion 60 of the ribbon 10. Then, the tying finger 50 rotates in a counterclockwise direction so that the hook member 62 moves alongside and to the left of the ribbon lead portion 60, as illustrated in FIG. 1F. This rotation of the hook 62 serves two functions; first, to enable the hook 62 to engage the ribbon lead portion 60 and pull it to the right to effect the tie, and second, to permit the release of the portion of the ribbon 10 lying outside and against the tying finger 50.

As shown in FIG. 1G, the tying finger 50 is moved to the right to slip out from beneath the adjacent portions of the loops of the ribbon 10 and to pull the ribbon lead portion 60 into a clamped position against the plate 30. The reel 12 begins to rotate in the reverse direction to pull the ribbon 10 rearwardly and tighten the ribbon around the wrapping area.

Next, as illustrated in FIG. 1H, the lower guide pin 48 retracts to release the lower portion of the two loops 64 and 66 of the ribbon 10. As this happens, the reel 12 continues to reel in the ribbon 10 so as to tighten the ribbon loops upwardly around the bundle 22. Also, the release arm 44 moves downwardly to move the locking finger 42 from its locking position and cause the jaws 40 to release the forward end 58 of the ribbon 10. Although not shown in FIG. 1H, the issuer device (which is to be described later herein) moves upwardly during the tying operation to cause the ribbon loop to pull the bundle 22 upwardly as the ribbon 10 is being tightened. Then, the issuer arm moves downwardly a short distance to cause a further tightening, and then back upwardly toward the tying location. During the same time, with the ribbon end 58 released from the jaws 40, the lead portion 60 of the ribbon 10 is pulled to some extent through the hook 62 which is, at that time, in its clamping looation. Also, the upper pin 46 retracts so that as the two ribbon loops are pulled further, they become wrapped snuggly against the bundle 24.

Next, with reference to FIG. 1I, a welding bar 70 moves outwardly to engage the tie area 72 of the ribbon 10 (i.e. that area where the lead portion 60 of the ribbon 10 crosses over the outside of the two loops at 72 and thence beneath the two ribbon loops at 74. See FIG. 2.) This weld bar 70 has previously been electrically heated for a short period so that it is at a sufficiently high temperature to soften the thermo adhesive coating on the four overlapping portions of the ribbon 10. Then, the weld bar 70 is permitted to cool so that the overlapping ribbon portions at the tie area 72 become bonded one to another.

After the bonding operation, the blade 28 moves forward to engage the ribbon 10 and sever the trailing ribbon portion 68 from the rest of the ribbon 10, with the newly formed end portion of the ribbon 10 now becoming the forward end 58 of the ribbon 10 for the next tying operation.

The tie which finally results is illustrated in FIG. 2. It can be seen that the ribbon 10 now forms two complete loops 64 and 66. As shown herein, the loop 64 extends from the tie area 72 to pass beneath the loop 66, but in the prototype apparatus described herein, the overlapping relationship is reversed. This can vary, depending on the precise arrangement and timing of the tying operation. The placement of the ribbon leading edge portion extending first over at 72 and the under the two loops at 74 forms a tie or knot so that the ribbon frictionally engages itself in overlapping relationship to form the tie. Thus, to maintain the tie, the tied ribbon is not solely dependent upon the strength of the bond. Further, since the ribbon is made of a quite flexible material, the tie or knot formed by the ribbon does not form an obstruction as the wire bundle 22 is pulled through holes in the aircraft structure during installation of the bundle 22.

(c) Detailed Description of the Apparatus

There will now be a description of the remaining components of the apparatus of the present invention which cooperate with the above described components to move them through the operating cycle shown in FIGS. 1B through 1J. The apparatus is conveniently assembled in a form of a hand tool illustrated in FIG. 3, hereinafter called a "gun 80". This gun 80 comprises a casing 82 having a depending hand grip 84 with an operating trigger 86. The aforementioned carrier ring 30 and mounting plate 32 are mounted at the forward end of the tool 80, and the receiving slots 34 and 36 can be seen in FIG. 3 at the extreme forward end of the gun 80.

It is to be recognized that the particular configuration of the gun 80 which is described herein is an initial prototype which was developed primarily to implement and refine the operating characteristics of the components that actually form the tie in the present invention. Thus, at such time as an actual production prototype is developed, it may be that some of the components of the gun 80 will be simplified, and that some of the functions of these components may be combined.

It is believed that a better understanding of the present invention will be achieved by first describing in general terms the components which are readily identifiable in the views of FIGS. 4, 5, and 6, indicating briefly their function and relationship to other components in the tool 80. After this, the components of the tool 80 will be described in more detail with reference to the other figures of the drawing.

FIG. 4 shows the left side of the gun 80 with the cover removed. It can be seen that the ribbon reel 12 is at the rear of the tool 80, and the carrier ring 30 and mounting plate 32 are at the forward end. There is a mounting frame 88 which attaches to the hand grip 84. Located at approximately the rear middle portion of this frame 88 is a welding cam 90 rotatably mounted about a center axis 92. This cam operates a cam follower 94 pivotally mounted at 96 and attached to an arm 98. The arm 98 in turn acts against a second pivotally mounted arm 100 to engage the aforementioned welding bar 70. An alternate arrangement of the cam follower 94 and its associated arms are shown in FIG. 13.

At the upper part of the tool 80 there is the ribbon issuer device 102. This issuer device is shown in more detail in FIGS. 7 and 8, and its structure and operation will be described in more detail later herein with reference to those figures.

With reference to FIG. 5, there is shown a reversable motor 104 which drives the reel 12 through a speed reducing transmission. There is also a drive gear 106 which is driven from a motor 108 (shown in FIG. 4). This drive gear 106 engages a belt 110 which is tensioned by a spring loaded arm 112 and drives a gear 114. The gear drive for the gun 80 is shown more clearly in FIG. 19, and the various gears will be described with respect to that figure. The gear 114 acts through a clutch 116 to turn a gear 118 that in turn engages the aforementioned upper and lower gears 38 that turn the carrier ring 30. The clutch member 116 is shown in more detail in FIGS. 11 and 12, and its function will be described later herein with respect to those figures.

The gear 14 has a direct drive to a smaller gear 120 which in turn meshes with a relatively large gear 122 which is in turn axially aligned with and fixedly attached to a smaller gear 124. This gear 124 in turn meshes with the main switch and cam gear 126.

Also, there is a fly wheel 128 mounted at the lower forward part of the gun 80. This fly wheel 128 has an operative connection to the clutch member 116, and its operation will be described later herein with respect to FIGS. 11 and 12.

The main cam gear 126 acts through a cam shaft to rotate five switching discs which are illustrated schematically in FIG. 19. These are as follows: a cutter switching disc 130, a drive motor switching disc 132, a weld power switching disc 134, a reel motor forward feed switching disc 136, and a motor reverse feed switching disc 138. It is to be understood that these switching discs 130 through 138 are shown somewhat schematically, and the functions of these could be combined in, for example, fewer discs (or possibly one disc), or the switches could be operated in proper sequence by some other means related to the operation of the cam gear 126.

In addition, the main cam gear 126 has its shaft fixedly connected to six operating cams. First, there is the previously mentioned weld cam 90, shown in both FIGS. 4 and 13. Second, there is a ribbon issuer cam 140 (shown in FIG. 10). Third, there is a clutch cam 142 (shown in FIG. 11) to operate the carrier ring 30. Fourth, there is a hook finger rotating cam 144 (shown in FIG. 14). Fifth, there is a release arm cam 146 (shown in FIG. 16). Sixth, there is a pin and tie finger cam 148 (shown in FIG. 18). The operation of these cams 90 and 140 through 148 will be described more fully later herein.

FIG. 6 is a top plan view of the gun 80 with the housing exposed. This view is simply to indicate the location of some of the components which are visable from a top plan view, and the appropriate numerical designations have been given to such components. However, there will be no detailed description of the components in relation to FIG. 6, since it is believed these can be better understood by reference to the other views.

Figure 7:
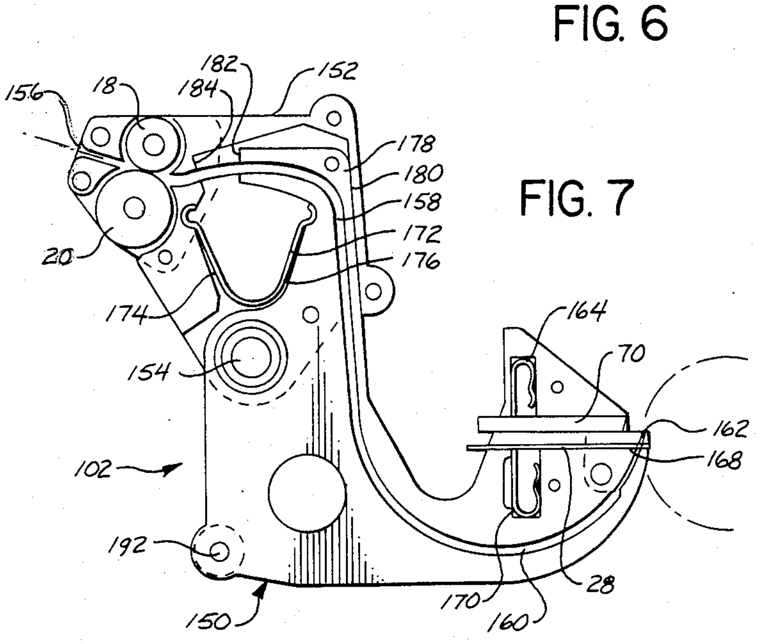
FIG. 7 is a side elevational view of the issuer device of the present invention.

FIG. 7 illustrates the previously mentioned ribbon issuing device 102. This device 102 comprises a lower issuing section 150, and an upper feed section 152. These sections 150 and 152 are pivotally mounted to one another at 154 to permit limited rotation of these sections 150 and 152 relative to one another. The reason for this (which will be described more fully hereinafter) is to cause the issuer device 102 to feed the ribbon 10 outwardly from the issuer device 102 a short distance so that the forward end 58 of the ribbon can be grasped by the gripper jaws 40.

Mounted at the upper rear end of the feed section 152 are the previously mentioned upper and lower feed rolls 18 and 20, respectively. There is a channel 156 into which the ribbon 10 is fed to be frictionally engaged by the two rolls 18 and 20, and these two rolls 18 and 20 in turn lead into a further track or channel 158 defined by the lower issuing section 150. This channel 158 extends downwardly and then forwardly in a loop at 160 (forming the aforementioned ribbon loop portion 24 shown in FIG. 1A) to terminate in an upwardly extending issuing slot 162. It is from this slot 162 that the ribbon 10 issues to be wrapped around the bundle 22 and formed into a tie.

Figure 8:
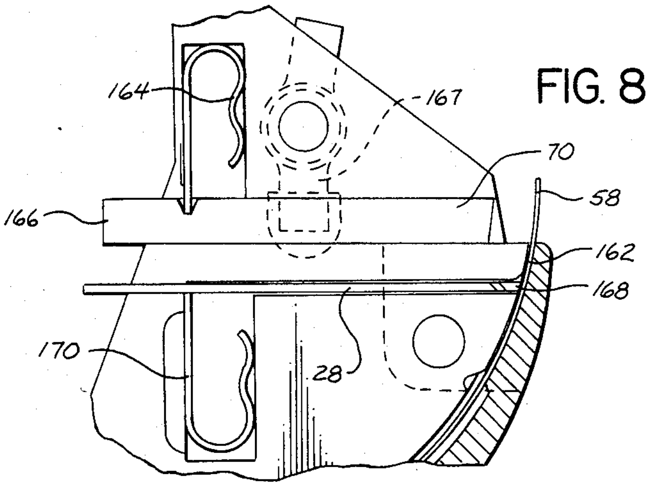
FIG. 8 is a side elevational view, drawn to an enlarged scale of the dispensing portion of the issuer device of FIG. 7.

The aforementioned welding bar 70 is slide mounted to the section 50 at a location just above and rearwardly of the issuing slot 162. This welding bar 70 is urged by a U-shaped spring 164 toward a rear position. As can be seen in FIG. 8, in operation, the rear end 166 of the bar 70 is engaged by a suitable push finger to move the bar forward to perform its heating and bonding operation. There is an electrode 167 which passes current through the bar 70 to cause it to heat up at the appropriate time in the cycle.

Slide mounted in the section 150 just below the bar 150 is the aforementioned cutting blade 28. The forward edge 168 of the blade 28 is in its normal position just rearwardly of the issuing slot 162 and a very short distance below the upper end of the slot 162. This blade 28 is urged by a U-shaped spring 170 to its non-engaged rear position. The two springs 164 and 170 are positioned in suitable slots so that the rear position of their related members (i.e. the welding bar 70 and the blade 28) are properly located.

There is a U-shaped spring member 172 having a pair of arms, a rear arm 174 pressing against the feed section 152, and a forward arm 176 pressing against the issuer section 150 so as to urge the section 152 rearwardly relative to the section 150. As shown in FIG. 7, the two structural portions 178 and 180 abut against one another to prevent any further rearward rotation of the member 152. However, the member 152 can rotate forwardly relative to the section 150, until the face 182 comes into abutment against the face 184 of the member 152.

There is attached to the lower feed roll 20 a ratchet wheel 186 which is engaged by a spring-like finger 188. This ratchet wheel 186 can be seen in FIG. 4 and FIG. 6. During the early part of the tying cycle, when the issuer device 102 is rotated to carry the ribbon end 58 upwardly, the upper section 152 rotate rearwardly a short distance to cause the finger 188 to act against the ratchet wheel 186 and rotates the lower feed roll 20 clockwise (as seen in FIG. 7) a short distance and feed the ribbon 10 a short distance through the channel 158 and out the issuer slot 162. After further rotation of the issuer device 102, the feed section 152 engages stationary structure to stop rotating, and there is a short further rotation of the issuer section 150 so that the surfaces 182 and 184 come into engagement, thus shortening the effective length of the slot 158. This causes a further small increment of feed of the ribbon from the feed slot 162. It is to be understood, of course, that other means could be used to provide such a feed, such as positively driving the feed rolls 18 and 20. However, this above described mechanical arrangement is a rather simple means of utilizing the rotational movement of the issuing device 102 to cause this short increment of feed of the ribbon 10 without need for any other drive mechanism.

The drive cam 140 for the issuer device 102 is illustrated in FIG. 10, and this can be seen to be formed with a cam slot 190 which engages one end of a cam follower (not shown for ease of illustration). The other end of the cam follower engaging the lower issuing section 150 at 192. The manner in which this cam 140 rotates the issuer during the operating cycle will be described in more detail later herein.

FIG. 13 shows the weld cam 90 with a cam follower configuration somewhat modified with respect to shown in FIG. 4. As shown in FIG. 13, there is a downwardly extending cam arm 194 which in turn acts through the arm 196 to rotate an arm 198 about pivot axis 200 to move the finger 202. This finger 202 functions to engage the rear end 166 of the bar 70 to move the weld bar 70 forwardly during the bonding portion of the cycle.

In FIG. 14, there is shown the cam 144 which functions to rotate the aforementioned tying finger to move the hook 62 to the appropriate angular position. There is a cam follower 204 rigidly attached to an arm 206 which is in turn pivotally attached to arm 208 that in turn is pivotally attached to the arm 210. The arm 210 is fixedly attached to the finger 50. It can be seen that with the cam follower 204 in the position of FIG. 14, the finger 62 is extending upwardly and rearwardly. When the cam follower 204 moves to a further outward position on the cam 144, the finger 62 moves toward its forward clamping position.

FIG. 16 illustrates the action of the release arm cam 146 engaging the rear end 212 of the release arm 44 that is pivotally mounted at 214. In FIG. 16, the arm 44 is shown in its raised, non-engaged position. Further rotation of the cam 146 will cause the arm 44 to move downwardly to engage the locking finger 42 and move it to its draw releasing position to cause the two gripping jaws to move apart.

FIG. 17 illustrates the blade actuating device, generally designated 216. There is a solenoid 218 which can be activated to retract an arm 220 against the urging of the spring 222 to cause the finger 224 to rotate rearwardly. This in turn causes the arm 226 to move forwardly against the cutting blade 28 to move the blade 28 to its cutting position.

FIG. 18 illustrates the pin and tie finger cam 148. Three actuating arms are shown engaging the cam 148, namely: an arm 228 for the upper pin 46, an arm 230 for the lower pin 48, and an arm 232 that engages the tying finger 50 for extension. Each of the arms 228, 230, and 232 are pivotally mounted at intermediate points 234, 236, and 238 respectively. The rear portion of the arm 228 engages a first outermost cam path at 240; the rear portion of the second intermediate arm 230 engages a second cam path 242; and the rear portion of the third innermost arm 232 engages a third cam path 244. As the cam 148 rotates, it moves the rear actuating arm portions 240, 242, and 244 laterally to cause the appropriate retraction and extension of the pins 46 and 48 and the finger 50.

FIG. 11 shows the operation of the cam 142 that controls the rotation of the carrier ring 30. As indicated previously, the gear 114 acts through the clutch 116 to rotate the gear 118 that in turn acts through the gears 38 to turn the carrier ring 30. As shown in FIG. 11, the clutch 116 is engaged by a pick finger 246 which acts on the clutch 116 so that no rotational motion is imparted to the gear 118. However, when the pick finger 246 is moved by the rotation of the cam 142 to disengage it from the clutch 116, the gear 118 rotates. A gear 248 is mounted on the same axis as the clutch 116 and is interconnected in the clutch mechanism 116 with the output shaft 250 which drives the gear 118 to turn the carrier ring 30. This gear 248 meshes with a gear (not shown) which is rigidly attached to, and concentric with, the aforementioned fly wheel 128.

In operation, when the pick finger 246 is moved to its disengaged position, so that the output shaft 250 rotates, the gear 248 also rotates to rotate the fly wheel 128. When the pick finger 246 moves off the raised cam surface of the cam 142 to again engage the clutch 116, the momentum of the fly wheel 128 causes a moderate further rotation of the gear 248. This carries the gear 248 to a moderately forward position where a rebound latch 251 engages a catch member 252 to prevent the gear 248 from rotating in a counterclockwise direction, as seen in FIG. 11. Also, this short continued rotation of the gear 248 acts against a coil spring 254 to tighten this spring 254 so that it is in a position to urge the gear 248 in a counterclockwise direction. Thus, at a later time in the cycle, when the finger 250 is lifted, the gear 248 rotates a short distance rearwardly to in turn rotate the shaft 250 to turn the gear 122 counterclockwise to in turn cause the carrier ring 30 to rotate a short distance in a circumferentially rearward direction. This takes place at the initial portion of the wrapping and tying cycle when the two jaws 40 are positioned at a slightly circumferentially rearward position to engage the end 58 of the ribbon 10. It is to be understood that this particular clutch is arranged with the spring mechanism to obtain limited circumferentially rearward motion of the carrier ring 30, and this could, of course, be accomplished by other means in an alternative design.

(d) Detailed Description of the Operation

The overall apparatus of the present invention will now be described by relating the operation of the components illustrated in FIGS. 3 through 19 with the sequence of steps illustrated in 1B through 1J.

Initially, the ribbon 10 is placed in the gun 80 so that it extends from the reel 12, around the roll 14, through the roll 16, thence through the two feed rolls 18 and 20, through the channel 158 in the issuer device 156 to the location of the issuing slot 162.

The gun 80 is conveniently held by the operator by placing his hand on the grip 84 and the forefinger engaging the trigger 86. In the beginning of the operating cycle, the carrier ring 30 is positioned so that its slot 30 is facing forwardly to provide open access into the tying area 36. The gun 80 is moved relative to a wire bundle 22 so that the bundle 22 is positioned in the wrapping area 36 (i.e. generally centrally of the ring 30). Then the trigger 86 is depressed to initiate the operating cycle. This causes the motor 108 to begin turning to in turn rotate the gear 106. This in turn acts through the speed reducing gear drive 114, 120, 122, and 124 to cause the main switch and cam gear 126 to rotate. The main gear 126 makes one complete revolution for each operating cycle. The five switching discs 130–138, and the six cams 90 and 140–148 are axially aligned with and fixedly attached to the main gear 126 so that these components also make one complete revolution during each operating cycle. In describing the operating cycle, the timing and sequence of each portion of the operation will be referenced to the degrees of rotation of the main gear 126.

At 0° (i.e. almost immediately after the trigger 86 is pulled) the issuer cam 140 begins to advance the issuer device forwardly a short distance and then rearwardly. This causes the finger 188 to act against the ratchet wheel 186 on the issuer device 102 to rotate the lower feed roll 20 and cause the forward end 58 of the ribbon 10 to travel outwardly a short distance from the issuing slot 162. The frictional engagement of the two feed rolls 18 and 20 maintains this position of the forward end 58 of the ribbon 10.

The issuer device 102 is rotated to its uppermost position so that the forward ribbon end 58 (extending a short distance beyond the issuing slot 162) is positioned between the two jaws 40, which are at this time held in the open position by reason of the arm 44 being pressed against the locking finger 42 so as to hold the finger 42 in its release position.

Continued rotation of the cam gear 126 causes the cam 146 to lift the arm 44 and cause the jaws 40 to grip the end of the ribbon. Then the issuer cam 140 to begin to move the issuer device 102 down to its fully retracted position. At approximately this same time, the rebound latch 251 is moved out of engagement with the stop member 252 (this being accomplished by a cam mechanism indicated schematically at 255 in FIG. 11) to permit the action of the spring 254 to rotate the gear 118 moderately clockwise (as seen in FIG. 19) to in turn cause the gripper jaws 40 to move a short distance circumferentially rearwardly. The effect of this is to move the ribbon 10 rearwardly of the tying finger 50, as shown in FIG. 1B.

At approximately 48° of rotation of the cam gear 126, the cam 148 acts on the three arms 228, 230, and 232 to cause the two locating pins 46 and 48 and the tying arm 50 to begin to extend. At the 54° position of the cam gear 126, the issuer cam 140 has moved the issuer device 102 to its furthest position of rotation in a downward and rearward direction. At this time, the upper and lower locating pins 46 and 48 and the tying finger 50 are fully extended.

At the 60° position of the cam gear 126, the hook rotating cam 144 causes the tie finger 50 to being rotation so that the hook 62 moves toward its rearwardly and upwardly extending position, as shown in FIG. 1C.

At the 66° position of the cam gear 126, the clutch control cam 142 activates the clutch pick 246 so as to lift it from the clutch and thus cause the clutch to be engaged to transfer power to the gear 118 to begin rotation of the carrier ring 30. At three more degrees rotation of the cam gear 126, the tying finger 50 has rotated so that the hook 62 is facing fully away from the tying area.

The carrier ring 30 now begins to rotate so that the jaws 40 carry the ribbon lead portion 60 on its circumferential wrapping path. At 96° rotation of the cam gear 126, the carrier ring 30 has completed approximately $1\frac{1}{4}$ revolutions, and the cam 148 begins to cause the tying finger to retract to the opposite side of the reference plane defined by the two axes 52 and 54. At the same time, the issuer cam 140 causes the issuer device 102 to begin to rotate forwardly and upwardly to a ribbon "cross over" position. At the 105° rotational position of the gear 126, the cam 148 has caused the tying finger 50 to retract to the extent that the continued rotation of the carrier ring 30 carries the ribbon 10 past the hook 62 (i.e. to the left side of the hook 62), this position being shown in FIG. 1E. At this point, the carrier ring 30 has nearly completed two full revolutions and the pick arm is permitted by the clutch cam 142 to drop into its clutch disengaging position. The momentum of the fly wheel 128 carries the gear 118 through a further increment of rotation to a position where the rebound latch 251 drops into place to engage the stop member 252. As indicated previously, this further rotational increment tightens the spring 254 in preparation for the next operating cycle.

At 132° rotation of the gear 126, the cam 148 causes the tying finger 50 to begin to extend toward its point of maximum extension. At this time, the two loops of the ribbon 10 are wrapped over the outside of the finger 50. At the 150° position of the main gear 126, the tying finger 50 has reached its fully extended position and the hook rotating cam 144 begins to rotate the hook 62 forwardly to the position shown in FIG. 1F.

At the 156° location, the switch disc 134 closes the circuit to deliver power to the weld bar 70 to cause it to begin to heat up. Also, the tying finger 50 beings retracting at this time.

By the time the main cam gear 126 has reached the 174° position, the tying finger 50 is fully retracted to the position shown in FIG. 1G. At this time, the hook 62 acts as a clamp to hold the lead portion 60 of the ribbon 10 in a recess in the plate 32 into which the hook 62 fits. As indicated previously, while the ribbon 10 is held snuggly in this clamped position by the hook 62, later in the cycle moderate slippage of the ribbon 10 by the hook 62 occurs. Also, at the 174° position, the cam 148 causes the lower pin 48 to begin to retract.

At 180° of the travel of the cam gear 126, the switch disc 136 causes the reel motor 104 to switch over to a high torque mode of operation to begin reeling in the ribbon 10. At the same time, the cam 146 for the gripper release arm 44 causes the arm 44 to lift so as to release the end portion 58 of the ribbon 10. Also, at this time, the issuer device 102 begins to rotate upwardly and forwardly toward its highest location.

At the 189° position of the cam gear 126, the cam 148 causes the upper pin 46 to begin to retract. At 192° location of the gear 126, the lower pin 48 is fully retracted and the jaws 40 have released the leading end 58 of the ribbon 10. At this time, the reel motor 104 is drawing in the ribbon 10 to tighten up the two loops 64 and 66 toward the wire bundle 22. The upper pin is holding the upper part of the ribbon loops in a higher position toward the upper part of the wrapping area.

By the time the cam gear 126 has reached the 207° position, the upper pin 46 is fully retracted, and the issuer device has now moved to its highest position so that the issuing slot 162 is near the upper part of the wrapping area. During the period that the cam gear 126 rotates from the 210° to the 237° position, the issuer device 102 is caused by its related cam 142 to rotate downwardly and rearwardly to tighten the ribbon 10. At this time, the ribbon 10 is stretched and actually pulled through the clamp provided by the hook 62 fitting against the plate 32. From the 237° position to the 246° position of the cam gear 126, the issuer device moves upwardly again to a desired location, and at the same time, the reel motor 104 continues to rotate to maintain tension on the ribbon 10. During this time, a clutch mechanism on the drive between the motor 104 and the reel 12 permits slippage in the clutch mechanism so that the reel 12 still exerts a pull.

At the 249° position of the cam gear 126, the welding cam 90 causes the welding bar 70 to extend to press against the tie area, as illustrated in FIG. 1I. In the illustration of FIG. 1I, the bundle 22 is shown at a location which is further downward than it would ordinarily be. Normally, the tie would be made at a higher area, and the weld bar 70 would engage the tie area of the ribbon 10 at the higher location. Shortly after this, the weld power switch 134 interrupts power to the weld bar 70 to permit it to cool. At the 306° position of the cam gear 126, the cam 90 permits the weld bar 70 to begin to retract toward its rest position by the action of the spring 164. At the 315° position of the cam gear 126, the welding bar 70 is fully retracted and the reel motor 104 is switched off by the action of the switching disc 136. In this condition, the ribbon 10 is tensioned between the location of the issuing slot of the issuer device 102 and the clamping hook 62.

At the 330° location of the cam gear 126, the cutter switch disc 130 causes the solenoid 218 to become activated to retract the arm 222, causing the arm 226 to push the cutter blade 28 forwardly, thus cutting the ribbon 10 and releasing it from the issuer device 102. This completes the formation of the ribbon tie, as shown in FIG. 2.

At the 339° position of the cam gear 126, the tying finger 50 is extended slightly so as to release its hold on the lead portion 62 of the ribbon 10, thus releasing the tied ribbon from the gun 80 entirely. At the 342° position of the cam gear 126, the switching disc 130 switches the power off to the solenoid 218, thus permitting the cutter 28 to be retracted by means of the return spring 164.

Power continues to be delivered to the drive motor 108 to carry the cam gear 126 a short distance further, and the motor 108 stops with the cam gear 126 at a location between the 348° to the 360° position. This completes one operating cycle of the gun 80, and it is ready to begin another cycle simply by repeating the steps recited above.

We claim:

1. An apparatus to tie a ribbon around an object, such as a bundle of wires, said apparatus comprising:

(a) a housing having:

(1) a wrapping area where there is a longitudinal axis, a vertical axis, and a transverse axis perpendicular to and intersecting the longitudinal and vertical axes;

(2) a reference plane coinciding with said longitudinal and vertical axes; and (3) a tying area spaced from said transverse axis;

said wrapping area having first and second sides on opposite sides of said reference plane, and an outside direction denoting location further from said transverse axis and an inside direction denoting location closer to said transverse axis;

(b) a carrier mounted to the housing and adapted to engage a lead portion of said ribbon and move in a wrapping path circumscribing said wrapping area;

(c) transversely movable locating pin and tie finger means to locate said ribbon around said wrapping area and to move said ribbon transversely;

(d) control means to move said carrier in a circumferentially forward direction along said wrapping path to the tying area so that a wrapping portion of the ribbon extends around the wrapping area and a trailing portion of the ribbon is positioned at the tying area on the second side of the lead portion, and to operate the locating and tie means to move the lead portion and trailing portion transversely relative to one another in one direction to move said lead portion to the second side of the trailing portion, with one of the portions being outside the other of the portions, then moving the lead portion and trailing portion transversely relative to one another in an opposite direction to move said lead portion to the first side of the trailing portion, with the other of said portions being inside said one of said portions to form a tie at the tie area.

2. The apparatus as recited in claim 1, wherein said control means is arranged to:

(a) move said carrier to move said lead portion to a first location on said path where said lead portion is on the first side of the trailing portion, then to move said locating and tie means to move the trailing portion transversely from the second side of the lead portion to the first side of the lead portion at a location circumferentially forward of the lead portion, then continuing movement of the carrier circumferentially forward to carry the lead portion across and to the second side of the trailing portion to a more circumferentially forward location;

(b) then moving the locating and tie means to engage the lead portion and move the lead portion transversely inside of said trailing portion to the first side of the trailing portion.

3. The apparatus as recited in claim 2, further comprising a bonding member adapted to engage said ribbon at said tie area to bond said lead and trailing portions of said ribbon at the tie area.

4. The apparatus as recited in claim 3, wherein said bonding member comprises a heatable bonding tip positioned to engage said ribbon, heating means to raise the temperature of said bonding member to a suitable bonding temperature, said control means including means to heat said bonding member and move said bonding member into engagement with the ribbon at the tie area subsequent to formation of said tie.

5. The apparatus as recited in claim 4, wherein there is a cutting member positioned to engage and cut the trailing portion of the ribbon, said control means including means to operate said cutting member to cut the ribbon subsequent to formation of the bond at the tie.

6. The apparatus as recited in claim 2, wherein there is a cutter member adapted to engage the trailing portion to cut the trailing portion from the ribbon, said control means comprising means to move the cutter to cut the ribbon subsequent to formation of the tie.

7. The apparatus as recited in claim 1, wherein said locating and tie means comprises retractable locating member means having a first position at said reference plane to engage said ribbon as the carrier is carrying the ribbon in the wrapping path so as to space said ribbon outside of said wrapping area, and a second position where said locating member means is moved away from said reference plane to release said ribbon, said locating and tie means further comprising tie member means adapted to reach inside of said ribbon as said ribbon is held by said locating member means and to engage said lead portion of the ribbon to move said lead portion from the second side of the ribbon to the first side of the ribbon to form the tie.

8. The apparatus as recited in claim 7, wherein said tie member means has a first position at said reference plane to engage said ribbon as said ribbon is carried around said wrapping path, and a second position to engage the lead portion of the ribbon, said control means being arranged to move the tie member means to the second position to engage the lead portion to move the lead portion inside of and to the one side of the trailing portion to form the tie.

9. The apparatus as recited in claim 7, further comprising means to move the leading and trailing portions of the ribbon from one another with respect to a linear path of said ribbon so as to tighten a ribbon loop at said wrapping area, said apparatus further comprising bonding means movable to engage the ribbon at the tie area to bond the lead and trailing ribbon portions.

10. The apparatus as recited in claim 9, wherein a cutting member positioned to engage and cut the trailing portion of the ribbon, said control means including means to operate said cutting member to form a cut subsequent to formation of the bond at the tie.

11. An apparatus to tie a ribbon around an object, such as a bundle of wires, said apparatus comprising:

(a) a housing having:

(1) a wrapping area where there is a longitudinal axis, a vertical axis, and a transverse axis perpendicular to and intersecting the longitudinal and vertical axes;

(2) a reference plane coinciding with said longitudinal and vertical axes.

(3) a tying area spaced from said transverse axis;

said wrapping area having first and second sides on opposite sides of said reference plane, and an outside direction denoting location further from said transverse axis and an inside direction denoting location closer to said transverse axis;

(b) a mounting plate located proximate said wrapping area and said tying area;

(c) a carrier ring having a generally circular configuration and generally surrounding said wrapping area, said ring being mounted for rotation to said mounting plate to travel in a wrapping path circumscribing said wrapping area;

(d) locating pin means mounted to said mounting plate at spaced locating positions at said wrapping area, said locating pin means being retractably mounted so as to have a first position at said reference plane and a second retracted position;

(e) tie finger means mounted to said plate and having a first position at said reference plane and a second position spaced to the one side of said reference plane;

(f) a bonding member mounted to said housing so as to be movable to engage said ribbon at the tie area;

(g) a cutter movably mounted so as to be able to engage said ribbon and cut said ribbon;

(h) an issuer member adapted to carry the ribbon and dispense said ribbon to be formed in a tie;

(i) gripping means mounted to said carrier ring to engage said ribbon and carry said ribbon around said wrapping area;

(j) control means to move said carrier ring in a circumferentially forward direction along said wrapping path to the tying area so that a wrapping portion of the ribbon extends around the wrapping area and a lead portion of the ribbon is positioned at the tying area on the first side of the trailing portion, and to move the trailing portion of the ribbon to the one side of the lead portion, then to move the tie finger means to engage the lead portion of the ribbon to move the lead portion inside of and to the one side of the trailing portion to form a tie at the tie area, then to move the bonding member into bonding engagement with the lead and trailing ribbon portions at the tie area, then to move the cutter to cut the trailing portion of the ribbon.

12. The apparatus as recited in claim 11, wherein said locating pin means comprises first and second pin members positioned on generally opposite sides of said transverse axis.

13. The apparatus as recited in claim 12, wherein said tie finger means comprises a transversely extending finger member having a first extended position at said reference plane, and a second retracted position adjacent said mounting plate.

14. The apparatus as recited in claim 13, wherein said tie finger has at an outer end thereof a laterally extending hook member adapted to engage said ribbon.

15. The apparatus as recited in claim 14, wherein said control means comprises tie finger control means adapted to extend and retract said tie finger and also to rotate said tie finger so as to move said hook member from a more outside directed position to a more inside directed position.

16. The apparatus as recited in claim 15, wherein said control means is arranged to move said tie finger transversely to carry said ribbon from said reference plane, then to rotate said carrier ring further so that said lead portion crosses over the trailing portion, then to rotate the tie finger so that said hook is positioned on the second side of said lead portion, then to move said tie finger transversely to move said lead portion inside of an to the one side of said trailing portion.

17. The apparatus as recited in claim 16, wherein said hook member is arranged to have a clamping position relative to said mounting plate, said control means being arranged to carry said lead portion after it has passed under the trailing portion to clamp the lead portion, said control means being arranged to retract said ribbon subsequent to clamping thereof by the hook member so as to tighten said ribbon loop and form a secure tie.

18. The apparatus as recited in claim 17, wherein said control means is arranged to move said bonding member into engagement with the ribbon at the tie area subsequent to clamping by the hook member.

19. The apparatus as recited in claim 18, wherein said control means is arranged to move said cutter member into engagement with the trailing portion after engagement of the ribbon by the bonding member.

20. The apparatus as recited in claim 19, wherein said control means is arranged to retract the bonding member prior to engagement of the ribbon by the cutter member to permit said ribbon at the bond to cool prior to cutting.

21. The apparatus as recited in claim 11, wherein said issuer member has a dispensing end at which said ribbon is dispensed, said issuer member being movable to a gripping position adjacent said gripping means and movable to a retracted position away from said gripping means, said control means being arranged to move said issuer means between its second position to its first position to cause engagement of said ribbon by said gripping means.

22. The apparatus as recited in claim 21, wherein said control means is arranged so that during formation of said tie, said issuer member is moved toward said first gripping position, and after formation of said tie, said issuer member is moved away from said first position to tighten said ribbon to form a secure tie.

23. The apparatus as recited in claim 22, wherein said apparatus is arranged so that said control means maintains said issuer device in a ribbon pulling position at the time when the control means moves the bonding member into engagement with the ribbon at the tie.

24. The apparatus as recited in claim 23, wherein said apparatus further comprises a reel member on which said ribbon is wound, said control means comprising means to rotate said reel member in a direction to discharge ribbon at the time the carrier ring is moving the ribbon around the wrapping area, and to retract said ribbon after the lead portion of the ribbon has been moved inside of and to the one side of said trailing portion.

25. An apparatus to tie a ribbon around an object, such as a bundle of wires, said apparatus comprising:

(a) a housing having:
   (1) a wrapping area where there is a longitudinal axis, a vertical axis, and a transverse axis perpendicular to and intersecting the longitudinal and vertical axes;
   (2) a reference plane coinciding with said longitudinal and vertical axes; and
   (3) a tying area spaced from said transverse axis;
said wrapping area having first and second sides on opposite sides of said reference plane, and an outside direction denoting location further from said transverse axis and an inside direction denoting location closer to said transverse axis;
(b) a mounting plate located proximate said wrapping area and to the one side of said reference plane, said mounting plate having a middle cutout to receive said object, said cutout opening to a forward peripheral portion thereof;
(c) a carrier ring having a generally circular configuration and generally surrounding said wrapping area, said ring having a through slot adapted to receive said object;
(d) a first upper locating pin positioned above said cutout and a second lower locating pin positioned below said cutout, said locating pins being substantially diametrically opposed, each of said locating pins being retractably mounted so as to have a first position at said reference plane and a second retracted position towards said plate;
(e) a tie finger mounted to said plate at a location circumferentially rearwardly of said first locating pin, said tie finger having at an outer end thereof a laterally extending hook member adapted to engage said ribbon, said tie finger being mounted for transverse movement between a first postion at said reference plane and a second retracted position away from said reference plane;
(f) an issuer member adapted to carry the ribbon and dispense the ribbon which is to be formed in a tie, said issuer member being movable between a first feed position and a second retracted position;
(g) a bonding member mounted to said issuer member for movement between a first retracted position and a second extended bonding position;
(h) a cutter mounted in the issuer member so as to be movable from a first retracted position to a second cutting position;
(i) gripper jaws mounted to said carrier ring to engage said ribbon and carry the ribbon around the wrapping area;
(j) control means operatively connected to said carrier ring, said locating pins, said tie finger, said bonding member, said cutter, said issuer member, and said gripping means to accomplish the following:
   (1) move said issuer member to its first position to feed an end of said ribbon into a position to be gripped by said jaws;
   (2) move said gripper jaws to grasp said ribbon;
   (3) locate said locating pins and said tie finger in their first extended positions;
   (4) rotate said carrier ring along said wrapping path to carry a lead portion of said ribbon circumferentially around said locating pins and toward said tie finger;
   (5) move said tie finger toward its retracted position to move a trailing portion of said ribbon to the one side of the reference plane;
   (6) rotate the carrier ring to carry the lead portion of the ribbon across the trailing portion of the ribbon to move the lead portion of the ribbon to a location circumferentially forward of the tie finger, forming at least one ribbon loop around the object;
   (7) move the tie finger to its extended position and locate the tie finger so that the hook member is to the second side of the ribbon lead portion;
   (8) retract the tie finger to move the lead portion of the ribbon beneath the trailing portion of the ribbon;
   (9) retract the pin members and retract the ribbon into the issuer member to tighten the ribbon loop around the object to form a secure tie at the tying area;
   (10) move the bonding member to its second bonding position to bond the lead and trailing ribbon portions;
   (11) move the cutter member to the second position to cut the trailing portion of the ribbon.

26. The apparatus as recited in claim 25, wherein said issuer device comprises a pair of feed rolls to direct said ribbon to a dispensing end of said issuer device, at least one of said feed rolls having a ratchet wheel attached thereto, said apparatus having a ratchet finger to rotate said ratchet wheel, said control means being adapted to move said dispenser member to push said ratchet wheel against said ratchet finger to rotate said ratchet wheel and in turn rotate said one of said feed rolls to advance said ribbon in said dispensing member so as to dispense an end portion of said ribbon outwardly from the dispensing end of the issuer device.

27. The apparatus as recited in claim 26, wherein said issuer device has a dispensing section and a feed section pivotally connected to said dispensing section, said feed section having means to engage said ribbon, said feed section being arranged so as to be moved rotatably relative to said dispensing section to advance said ribbon in said dispensing section and move an end section of said ribbon outwardly from the dispensing end of the dispensing section.

28. The apparatus as recited in claim 25, wherein said carrier ring is formed with peripheral drive teeth, meshing with two circumferentially spaced drive gears, whereby said drive gears are in constant driving engagement with said carrier ring.

29. The apparatus as recited in claim 25, wherein there is a gripper jaw release member adapted to engage said gripper jaws to move them between release and engaging positions, said control means being arranged to operate said release member to cause said gripper jaws to engage the ribbon end after the issuer device has placed the ribbon end in an engaged position relative to the gripper jaws.

30. The apparatus as recited in claim 25, further comprising a drive motor, said drive motor having a drive connection to a cam gear connected to drive cam means, said drive gear having a second operative connection to a drive member for said carrier ring, said cam means having cam follower means adapted to move said locating means between retracted and extended positions to move said tie finger between its extended and retracted positions, and also to rotate said tie finger, and to move said issuer device between its first and second positions.

31. The apparatus as recited in claim 30, wherein there is clutch means adapted to engage the drive for the carrier ring, and said cam means moves to cause engagement and disengagement of said clutch means to cause controlled rotation of said carrier ring.

32. The apparatus as recited in claim 30, further comprising switch control means operatively connected to said cam gear, said switch control means being operatively connected to said bonding member and said cutting member to move said bonding member and said cutting members between their first and second positions, and also to deliver current to said bonding member to bring it to a bonding temperature.

33. A method of tying a ribbon around an object, such as a bundle of wires where there is:

(a) a wrapping area comprising locating pin means where there is a longitudinal axis, a vertical axis, and a transverse axis perpendicular to and intersecting the longitudinal and vertical axes;

(b) a reference plane coinciding with said longitudinal and vertical axes; and (c) a tying area comprising tie finger means spaced from said transverse axis;

(d) said wrapping area having first and second sides on opposite sides of said reference plane, and an outside direction denoting location further from said transverse axis and an inside direction denoting location closer to said transverse axis;

said method comprising:

(a) engaging a lead portion of said ribbon and moving said lead portion about said locating pin means in a wrapprng path circumscribing said wrapping area;

(b) continuing to move said ribbon to the tying area so that a wrapping portion of the ribbon extends around the wrapping area in at least one loop and a trailing portion of the ribbon is positioned at the tying area on the second side of the lead portion;

(c) moving the lead portion and trailing portion transversely by tying finger means relative to one another in one direction to move said lead portion to the second side of the trailing portion, with one of the portions being outside the other of the portions;

(d) then moving the lead portion and trailing portion transversely relative to one another in an opposite direction to move said lead portion to the first side of the trailing portion, with the other of said portions being inside said one of said portions to form a tie at the tie area.

34. The method as recited in claim 33, further comprising:

(a) moving said lead portion by a carrier to a first location on said path where said lead portion is on the first side of the trailing portion;

(b) then moving the trailing portion transversely from the second side of the lead portion to the first side of the lead portion at a location circumferentially forward of the lead portion;

(c) then continuing movement of the carrier circumferentially forward to carry the lead portion across and to the second side of the trailing portion to a more circumferentially forward location;

(d) then moving the lead portion transversely inside of said trailing portion to the first side of the trailing portion.

35. The method as recited in claim 34, further comprising engaging said ribbon at said tie area by a bonding member to bond said lead and trailing portions of said ribbon at the tie area.

36. The method as recited in claim 35, further comprising heating said bonding member to a suitable bonding temperature, and then moving said bonding member into engagement with the ribbon at the tie area subsequent to formation of said tie.

37. The method as recited in claim 36, further comprising cutting a trailing portion of the ribbon subsequent to formation of the bond at the tie.

38. The method as recited in claim 25, wherein there is a locating means comprising retractable locating member means having a first position at said reference plane to engage said ribbon as the carrier is carrying the ribbon in the wrapping path so as to space said ribbon outside of said wrapping area, and a second position where said locating member means is moved away from said rererence plane to release said ribbon, said method further comprising moving the tying means to reach inside of said ribbon as said ribbon is held by said locating member means and to engage said lead portion of the ribbon and moving said lead portion from the second side of the ribbon to the first side of the ribbon to form the tie.

39. The method as recited in claim 38, wherein said tying means has a first position at said reference plane to engage said ribbon as said ribbon is carried around said wrapping path, and a second position to engage the lead portion of the ribbon, said method further comprising moving tying means to the second position to engage the lead portion to move the lead portion inside of and to the one side of the trailing portion to form the tie.

40. The method as recited in claim 33, further comprising moving the leading and trailing portions of the ribbon from one another with respect to a linear path of said ribbon so as to tighten a ribbon loop at said wrapping area, and then moving a bonding member to engage the ribbon at the tie area to bond the lead and trailing ribbon portions.

41. A method to tie a ribbon around an object, such as a bundle of wires, where there is:

(a) a wrapping area where there is a longitudinal axis, a vertical axis, and a transverse axis perpendicular to and intersecting the longitudinal and vertical axes;

(b) a reference plane coinciding with said longitudinal and vertical axes; and (c) a tying area spaced from said transverse axis;

(d) said wrapping area having first and second sides on opposite sides of said reference plane, and an outside direction denoting location further from said transverse axis and an inside direction denoting location closer to said transverse axis;

(e) a mounting plate located proximate said wrapping area and said tying area;

(f) a carrier ring having a generally circular configuration and generally surrounding said wrapping area, said ring being mounted for rotation to said mounting plate to travel in a wrapping path circumscribing said wrapping area;

(g) locating pin means mounted to said mounting plate at spaced locating positions at said wrapping area, said locating pin means being retractably mounted so as to have a first position at said reference plane and a second retracted position;

(h) tie finger means mounted to said plate and having a first position at said reference plane and a second position spaced to the one side of said reference plane;

(i) a bonding member mounted to said housing so as to be movable to engage said ribbon at the tie area;

(j) a cutter movably mounted so as to be able to engage said ribbon and cut said ribbon;

(k) an issuer member adapted to carry the ribbon and dispense said ribbon to be formed in a tie;

(l) gripping means mounted to said carrier ring to engage said ribbon and carry said ribbon around said wrapping area;

said method comprising:

(a) moving said carrier ring in a circumferentially forward direction along said wrapping path to the tying area so that a wrapping portion of the ribbon extends around the wrapping area in at least one loop and a lead portion of the ribbon is positioned at the tying area on the first side of the trailing portion;

(b) moving the trailing portion of the ribbon to the one side of the lead portion;

(c) then moving the tie finger means to engage the lead portion of the ribbon to move the lead portion inside of and to the one side of the trailing portion to form a tie at the tie area;

(d) then moving the bonding member into bonding engagement with the lead and trailing ribbon portions at the tie area;

(e) then moving the cutter to cut the trailing portion of the ribbon.

42. The method as recited in claim 41, wherein there are first and second pin members positioned on generally opposite sides of said transverse axis.

43. The method as recited in claim 42, wherein said tie finger has at an outer end thereof a laterally extending hook member adapted to engage said ribbon, said method further comprising moving said tie finger transversely to carry said ribbon from said reference plane, then rotating said carrier ring further so that said lead portion crosses over the trailing portion, then rotating the tie finger so that said hook is positioned on the second side of said lead portion, then moving said tie finger transversely to move said lead portion inside of an to the one side of said trailing portion.

44. The method as recited in claim 43, wherein said hook member is arranged to have a clamping position reiative to said mounting plate, said method futher comprising moving said lead portion after it has passed under the trailing portion to clamp the lead portion, then retracting said ribbon subsequent to clamping thereof by the hook member so as to tighten said ribbon loop and form a secure tie.

45. The method as recited in claim 44, further comprising moving said bonding member into engagement with the ribbon at the tie area subsequent to clamping by the hook member.

46. The method as recited in claim 45, further comprising moving said cutter member into engagement with the trailing portion after engagement of the ribbon by the bonding member.

47. The method as recited in claim 46, further comprising retracting the bonding member prior to engagement of the ribbon by the cutter member to permit said ribbon at the bond to cool prior to cutting.

48. The method as recited in claim 41, wherein said issuer member has a dispensing end at which said ribbon is dispensed, said method further comprising moving said issuer member to cause engagement of said ribbon by said gripping means at the location of the gripping means.

49. The method as recited in claim 48, wherein during formation of said tie, said issuer member is moved toward said first gripping position, and after formation of said tie, said issuer member is moved away from said first position to tighten said ribbon to form a secure tie.

50. The method as recited in claim 49, further comprising maintaining said issuer device in a ribbon pulling position at the time when the bonding member is moved into engagement with the ribbon at the tie.

51. An apparatus to tie a ribbon around an object, such as a bundle of wires, said apparatus comprising:

(a) a housing having:

(1) a wrapping area where there is a longitudinal axis, a vertical axis, and a transverse axis perpendicular to and intersecting the longitudinal and vertical axes;

(2) a reference plane coinciding with said longitudinal and vertical axes; and (3) a tying area spaced from said transverse axis;

said wrapping area having first and second sides on opposite sides of said reference plane, and an outside direction denoting location further from said transverse axis and an inside direction denoting location closer to said transverse axis;

(b) a carrier mounted to the housing and adapted to engage a lead portion of said ribbon and move in a wrapping path circumscribing said wrapping area;

(c) transversely movable locating pin and tie finger means to locate said ribbon around said wrapping area and to move said ribbon transversely;

(d) control means to move said carrier in a circumferentially forward direction along said wrapping path to the tying area so that a wrapping portion of the ribbon extends in two loops around the wrapping area and a trailing portion of the ribbon is positioned at the tying area on the second side of the lead portion, and to operate the locating and tie means to move the lead portion and trailing portion transversely relative to one another in one direction to move said lead portion to the second side of the trailing portion, with one of the portions being outside the other of the portions, then moving the lead portion and trailing portion transversely relative to one another in an opposite direction to move said lead portion to the first side of the trailing portion, with the other of said portions being inside said one of said portions to form a tie at the tie area.

52. A method of tying a ribbon around an object, such as a bundle of wires, where there is:

(a) a wrapping area comprising locating pin means where there is a longitudinal ax a vertical axis, and a transverse axis perpendicular to and intersecting the longitudinal and vertical axes;

(b) a reference plane coinciding with said longitudinal and vertical axes; and (c) a tying area comprising tie finger means spaced from said transverse axis;

(d) said wrapping area having first and second sides on opposite sides of said reference plane, and an outside direction denoting location further from said transverse axis and an inside direction denoting location closer to said transverse axis;

said method comprising:

(a) engaging a lead portion of said ribbon and moving said lead portion about said locating pin means in a wrapping path circumscribing said wrapping area;

(b) continuing to move said ribbon to the tying area so that a wrapping portion of the ribbon extends around the wrapping area in at least two loops and a trailing portion of the ribbon is positioned at the tying area on the second side of the lead portion;

(c) moving the lead portion and trailing portion transversely by tying finger means relative to one another in one direction to move said lead portion to the second side of the trailing portion, with one of the portions being outside the other of the portions;

(d) then moving the lead portion and trailing portion transversely relative to one another in an opposite direction to move said lead portion to the first side of the trailing portion, with the other of said portions being inside said one of said portions to form a tie at the tie area.

* * * * *